US012019777B2

United States Patent
Shriver et al.

(10) Patent No.: US 12,019,777 B2
(45) Date of Patent: *Jun. 25, 2024

(54) SYSTEM AND METHOD FOR IMPLEMENTING DATA SOVEREIGNTY SAFEGUARDS IN A DISTRIBUTED SERVICES NETWORK ARCHITECTURE

(71) Applicant: Open Text Holdings, Inc., Menlo Park, CA (US)

(72) Inventors: Richard D. Shriver, Tinton Falls, NJ (US); Edward T. Pieluc, Jr., Howell, NJ (US); Daniel J. McDonald, Whitehouse Station, NJ (US); Hugh Beverly Appling, Hickory, NC (US); David Alan Hammaker, Oakland Park, FL (US); Zheng Sun, Greenacres, FL (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,457

(22) Filed: May 1, 2023

(65) Prior Publication Data

US 2023/0274018 A1 Aug. 31, 2023

Related U.S. Application Data

(63) Continuation of application No. 17/850,613, filed on Jun. 27, 2022, now Pat. No. 11,704,428, which is a
(Continued)

(51) Int. Cl.
*G06F 21/62* (2013.01)
*H04L 9/40* (2022.01)
(Continued)

(52) U.S. Cl.
CPC .......... *G06F 21/6218* (2013.01); *H04L 63/20* (2013.01); *H04L 67/1095* (2013.01);
(Continued)

(58) Field of Classification Search
CPC ......... G06F 21/6218; G06F 2221/2111; H04L 63/20; H04L 63/102; H04L 67/1095; H04L 67/306; H04L 67/10; H04W 4/021
(Continued)

(56) References Cited

U.S. PATENT DOCUMENTS

2013/0346522 A1* 12/2013 Lennstrom ............ H04L 51/214
709/206
2015/0281453 A1* 10/2015 Maturana .............. G06F 9/5072
379/265.12
(Continued)

*Primary Examiner* — Michael S McNally
(74) *Attorney, Agent, or Firm* — Sprinkle IP Law Group (57) ABSTRACT

Embodiments of systems and methods for implementing data sovereignty safeguards in a distributed services network architecture are disclosed. Embodiments of a distributed services system may have a number of distributed nodes that each implements a set of services. When a user requests a service at a particular node of a distributed services system, the node is configured to determine if that node is not (or is) data sovereign for a region associated with the user. If the node is not data sovereign for the user's region, the user may be directed to a corresponding service at a node of the distributed service system that is data sovereign for the user's region.

18 Claims, 3 Drawing Sheets

Related U.S. Application Data continuation of application No. 16/997,568, filed on Aug. 19, 2020, now Pat. No. 11,403,415, which is a continuation of application No. 15/956,045, filed on Apr. 18, 2018, now Pat. No. 10,803,191.

(60) Provisional application No. 62/486,757, filed on Apr. 18, 2017.

(51) Int. Cl.
    *H04L 67/1095*     (2022.01)
    *H04L 67/306*      (2022.01)
    *H04L 67/10*       (2022.01)
    *H04W 4/021*      (2018.01)

(52) U.S. Cl.
    CPC .... *H04L 67/306* (2013.01); *G06F 2221/2111* (2013.01); *H04L 63/102* (2013.01); *H04L 67/10* (2013.01); *H04W 4/021* (2013.01)

(58) Field of Classification Search
    USPC .......................................................... 726/27
    See application file for complete search history.

(56) References Cited

U.S. PATENT DOCUMENTS

| | | | | |
|---|---|---|---|---|
| 2015/0356433 | A1* | 12/2015 | Sanchez | G06N 20/00 706/12 |
| 2016/0124987 | A1* | 5/2016 | Plumb | G06F 16/1767 707/827 |
| 2016/0125195 | A1* | 5/2016 | Plumb | G06F 21/6218 726/30 |
| 2017/0099181 | A1* | 4/2017 | Hawking | G06F 16/972 |

* cited by examiner

SYSTEM AND METHOD FOR IMPLEMENTING DATA SOVEREIGNTY SAFEGUARDS IN A DISTRIBUTED SERVICES NETWORK ARCHITECTURE

RELATED APPLICATIONS

This application is a continuation of, and claims a benefit of priority under 35 U.S.C. 120 from, U.S. patent application Ser. No. 17/850,613 filed Jun. 27, 2022, issued as U.S. Pat. No. 11,704,428, entitled "SYSTEM AND METHOD FOR IMPLEMENTING DATA SOVEREIGNTY SAFEGUARDS IN A DISTRIBUTED SERVICES NETWORK ARCHITECTURE", which is a continuation of, and claims a benefit of priority under 35 U.S.C. 120 from, U.S. patent application Ser. No. 16/997,568 filed Aug. 19, 2020, issued as U.S. Pat. No. 11,403,415, entitled "SYSTEM AND METHOD FOR IMPLEMENTING DATA SOVEREIGNTY SAFEGUARDS IN A DISTRIBUTED SERVICES NETWORK ARCHITECTURE", which is a continuation of, and claims a benefit of priority under 35 U.S.C. 120 from, U.S. patent application Ser. No. 15/956,045 filed Apr. 18, 2018, issued as U.S. Pat. No. 10,803,191 entitled "SYSTEM AND METHOD FOR IMPLEMENTING DATA SOVEREIGNTY SAFEGUARDS IN A DISTRIBUTED SERVICES NETWORK ARCHITECTURE", which claims a benefit of priority under 35 U.S.C. § 119(e) from U.S. Provisional Patent Application Ser. No. 62/486,757 filed Apr. 18, 2017, entitled "SYSTEM AND METHOD FOR IMPLEMENTING DATA SOVEREIGNTY SAFEGUARDS IN A DISTRIBUTED SERVICES NETWORK ARCHITECTURE", which are fully incorporated herein by reference for all purposes.

TECHNICAL FIELD

This disclosure relates generally to data transmission and storage in a network environment. More specifically, this disclosure relates to the implementation of data sovereignty with respect to the transmission and storage of data in a distributed services network environment.

BACKGROUND

Data sovereignty is the concept that data may be subject to the laws, regulations or policies (collectively regulations) of entities from which data originated, through which the data passes or where the data resides or is stored. These entities may be the geographic regions, countries, nations, states or unions from which the data originated or through which the data passes, or an entity such as an enterprise which has certain regulations that pertain to data originating or passing through that enterprise. Examples of rules or regulations pertaining to data sovereignty are the General Data Protection Regulation(s) (GDPR) of the European Union (EU) or Chapter 8 of the Australian Privacy Principles.

Enterprises may be required, or may desire, to adhere to such data sovereignty regulations. Current distributed network architectures and distributed or cloud based deployment of many computing services makes dealing with these data sovereignty issues extremely difficult.

What is desired then, is to implement, and better enforce, data sovereignty in a distributed computer services architecture.

SUMMARY

Again, data sovereignty is the concept that data may be subject to the regulations of entities (e.g., geographic regions, countries, nations, states, entities, unions or the like) from which data originated, through which the data passes or where the data resides or is stored. Enterprises may be required, or may desire, to adhere to such data sovereignty rules, regulations or guidelines (collectively regulations hereinafter) either because these requirements have been imposed on them or because of policies of the enterprise itself.

Current distributed network architectures and distributed or cloud based deployment of many computing services makes dealing with these data sovereignty issues extremely difficult. In particular, in many cases, enterprises have computing installations in different geographic regions that may be subject to different data sovereignty regulations. Moreover, the computing services or third party providers (collectively service providers) utilized by an enterprise (or users thereof) may also be distributed, with computing nodes of the service providers also geographically distributed across the world.

Not only may the geographic locales where the distributed nodes of the service provider reside not be congruent with the distributed installations of the enterprise (which may subject the data passing through or residing at the nodes of a distributed service system to different data sovereignty regulations than the installation of the enterprise); but additionally because of the nature of data transmission over a distributed network, the data transmitted from an enterprise installation may pass through many different nodes unbeknownst to users of the enterprise that transmitted the original data.

These problems are exacerbated by the way such service providers provide the services. In many cases, the service providers may offer an interface that may be accessed at an address (e.g., an email address or domain name), through a web services interface, an application programming interface (API), a portal presented through a web browser, or through other interfaces. Such an interface may be offered to users of an enterprise regardless of the installation of the enterprise where a user normally accesses the service provider.

The user, however, has no knowledge of where the accessed node (or nodes that may implement his request) actually resides, and thus may not have any idea to what data sovereignty regulations his data may eventually be subject. Moreover, further exacerbating the problem in many cases, a user with an account at the enterprise may be travelling and may be transmitting data using the service provider from a different enterprise installation in a different geographic region.

To deal with some of these issues, service providers may provide specialized interfaces where each of the interfaces corresponds to other regions. The nodes of the service provider associated with each of the addresses may implement data sovereignty regulations corresponding to other regions. So, for example, an address to send a fax from Europe may be provided and an address to send a fax from the United States may be provided. The node of the service provider associated with the European address may be configured to implement data sovereignty regulations associated with Europe, while the node of the service provider node of the service provider associated with the United States address may be configured to implement data sovereignty regulations associated with the United States. Users of an enterprise who are at an installation in Europe may be encouraged to use the address for Europe while users in the United States may be encouraged to use the address associated with the United States.

While such an arrangement may be helpful, it does not completely ameliorate data sovereignty issues, as users of the enterprise may not be restricted to using such addresses. Because of the architecture or implementation of enterprises or service providers, a user of an enterprise may, in many cases, use either address to send data. Additionally, users of an enterprise may not be diligent about updating the interfaces (or references to these interfaces) that they use to send data. Thus, legacy addresses that do not implement appropriate data sovereignty may still be utilized by users.

What is desired then, is to implement, and better enforce, data sovereignty in a distributed computer services architecture.

To those ends, among others, attention is directed to embodiments of systems and methods for implementing data sovereignty safeguards in a distributed services network architecture. Embodiments of a distributed services system may have a number of distributed nodes that each implement a set of services. When a user requests a service at a particular node of the distributed services system, the node is configured to determine if that node is not data sovereign for a region associated with the user. If the node is not data sovereign for the user's region, the user may be provided with, or otherwise directed to, a corresponding service at a node of the distributed service system that is data sovereign for the user's region.

In this context, data sovereignty for a region means that the regulation(s) associated with that region can be adhered to when transmitting or storing data using that node (e.g., a node that is data sovereign for that region). Again, these regions may be associated with geographic, national or governmental entities (e.g., sovereign states or unions), non-governmental organizations such as corporations or other enterprises, etc.

In particular, in one embodiment, a distributed service system may have multiple nodes where each node may provide one or more independently accessible interfaces, each interface associated with a service such that the associated service can be requested through the interface. These services may be involved in the transmission or storage of data such as fax services (including email to fax), email, web portals, simple messaging service (SMS) or other services. Each node may maintain a set of user accounts by which users of an enterprise can be authenticated. The user account for a user may include a region identifier for a region associated with the user. User accounts for users of the distributed service system may be propagated or replicated across the nodes of a service provider such that each of the nodes has access to the same set of user accounts.

Additionally, each node of the distributed service system may maintain a data sovereignty configuration whereby each region identifier for which the node is not data sovereign will be associated with that node. In certain embodiments, this data sovereignty configuration may also be propagated or replicated across the nodes of the distributed service system such that each of the nodes has access to the same data sovereignty configuration. In such embodiments, the data sovereignty configuration may contain an identifier for each node, where each node identifier is associated with zero or more region identifiers for regions for which the node is not data sovereign.

Each of the services at each of the nodes of the distributed service system may include a data sovereignty module for implementing data sovereignty safeguards with respect to that service on that node. When a user requests a service at a particular node through the interface associated with that service, the data sovereignty module of that service at that node may access that user's account and determine the user's associated region (e.g., the region identifier associated with that user's account). Alternatively, a region identifier may be determined for that user or user's request based on other information, such as the Internet Protocol (IP) address from which the request originated, or other data associated with the request or user.

Using the data sovereignty configuration of the node, the data sovereignty module can determine if the node on which the service resides is not data sovereign for the region associated with user. Such a determination may be made, for example, by comparing a region identifier associated with the user or user request with one or more region identifiers for which the node is not data sovereign (e.g., as determined from the data sovereignty configuration for the node). If the node at which the request was received is not data sovereign for the user's region, a response may be returned to the user indicating the request cannot be completed. This response may also include the address or other location through which a corresponding service on a node that is data sovereign for the user's region may be accessed. If, however, the node is data sovereign for the user's region, the data may be transmitted or stored according to the originally received request.

Accordingly, as such, embodiments as disclosed herein may offer a number of advantages related to improvements in computer performance and efficiencies of implementation and use. In particular, embodiments will provide the advantage that these data sovereign safeguards may be implemented substantially without involvement of the user himself. In fact, in certain instances the user may not have to track or be aware of the proper address for a service that is data sovereign for his region. The user may submit the request for the service to a known node or address of the distributed service system and the distributed service system may direct him to the appropriate node for his region.

Moreover, because data sovereignty can be checked and evaluated in real time, the security of both distributed service systems and user data may be increased, as nodes of the system are not allowed to process or store data which may not be compliant with data sovereignty rules, regulations or desires. Efficiency may also be increased, as users may be provided with proper interfaces or locations for transmission of their data which may be compliant with data sovereignty rules, regulations or desires to which the user is subject, allowing a user to directly ascertain or access such interfaces or locations.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, the implementation of data sovereignty may be important to enterprises with respect to their data. The implementation of data sovereignty is especially difficult given the prevalence of distributed network architectures and distributed or cloud based deployment of many computing services. These difficulties may be better explained with reference to FIG. 1, which depicts a distributed network environment that includes a distributed service system comprised of nodes 110. These nodes 110 are internetworked using network 130 which may include the Internet, an intranet, a Wide Area Network (WAN), a Local Area Network (LAN), a wireless cellular network a mixture of different types of networks or another type of computing network.

Figure 1:
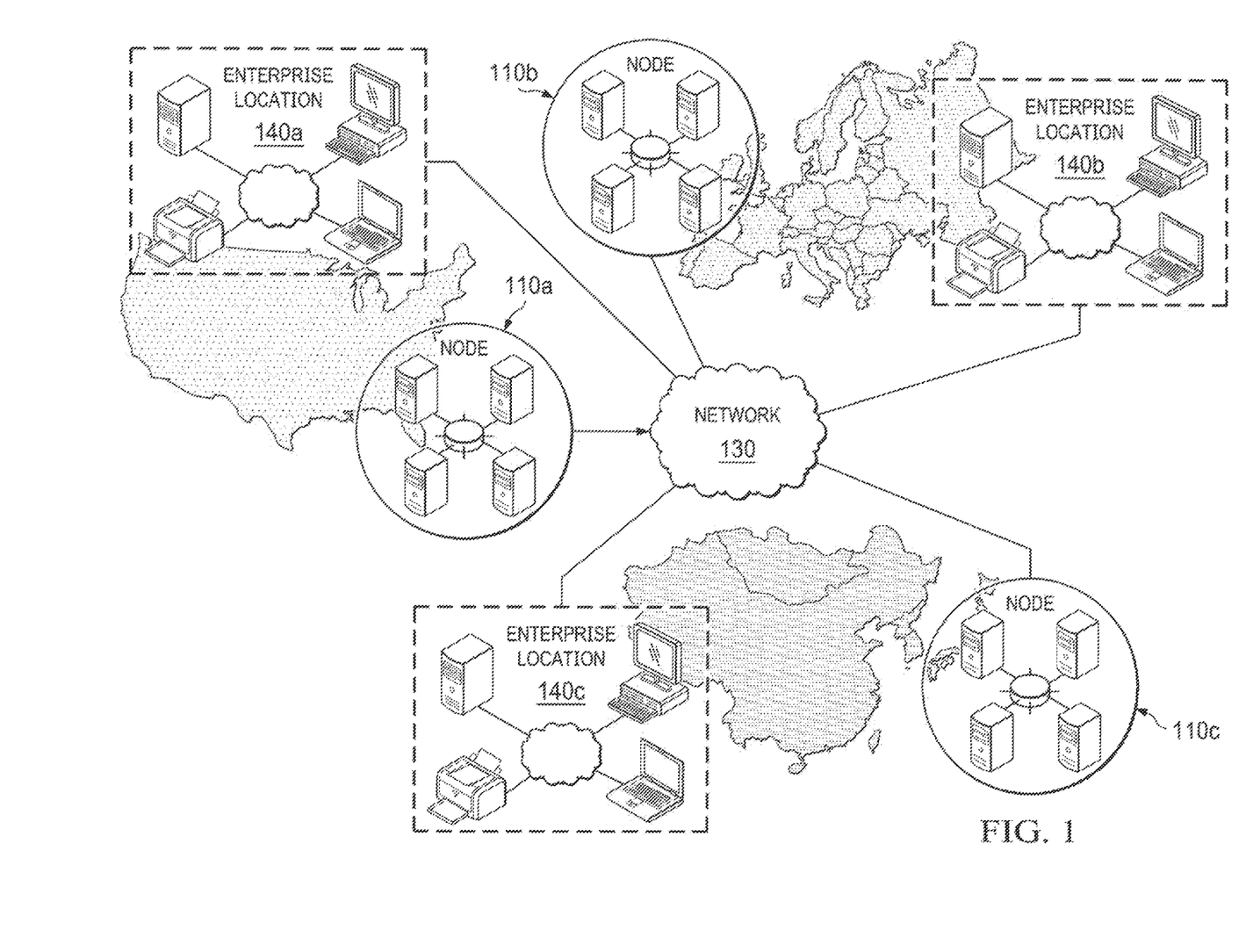
FIG. 1 depicts an architecture for a distributed services network architecture.

Each node 110 may include one or more servers deployed in a certain region (e.g., geographic, governmental, country, union, etc.) that are configured to implement a set of functionality. Here, for example, node 110a may include a set of servers deployed in the United States while node 110b may include servers deployed in the European Union and node 110c includes servers deployed in Japan.

The functionality offered by the nodes 110 may be offered as one or more services that may be accessed over network 130 through interfaces offered by the node 110. These services may include, for example, a fax service, a fax to email service, an email service, an SMS service, etc. It will be noted that each node 110 may offer the same or different services. Each node 110 may have one or more unique addresses (e.g., IP addresses) and the interface for each service provided by the node 110 may be accessible at a unique address (which may be associated with the unique address for the node 110 itself).

Continuing with the above example, node 110a in the United States may offer an email to fax service accessible at one address (e.g., a "phonenumber@f2m.com" address) while node 110b in the European Union may offer an email to fax service accessible at another address (e.g., a "phonenumber@eu.f2m.com" address). As another example, node 110a in the United States may offer a file transfer protocol (FTP or ftp) service accessible at one address (e.g., an "ftp.com" address) while node 110b in the European Union may offer an ftp service accessible at another address (e.g., an "eu.ftp.com" address).

Similarly, an enterprise may have one or more distributed locations 140 where users of the enterprise may access or utilize the computing resources of the enterprise. Each location 140 therefore includes a number of networked computing devices and, in most cases, the locations 140 of the enterprise are also internetworked using network 130 such that the computing resources of one location 140 of the enterprise may communicate with the computing resources of the other locations 140 of the enterprise.

Thus, the enterprise may have computing installations in different regions that may be subject to different data sovereignty regulations. In the depicted example for instance, enterprise location 140a may include computing resources located in the United States while enterprise location 140b may include computing resources deployed in the European Union and enterprise location 140c includes computing resources deployed in Japan.

The enterprise may utilize the services provided by the distributed service system comprised of nodes 110. In particular, the users at an enterprise location 140 may issue requests over network to the interfaces provided by the nodes 110 to access the associated services to, for example, fax data, email, send SMS messages, or to access other services provided by distributed services system to transmit or store data.

As discussed, it is desirable to implement data sovereignty regulations with respect to the data transmitted or stored by these services. For example, users of the enterprise residing in the European Union (or associated with the enterprise location 140b in the EU or otherwise governed by regulations of the EU) may desire that data from the user not be stored or transmitted by nodes 110a residing in the United States.

Again, while the nodes 110 may implement data sovereignty regulations corresponding to the associated region in which they are deployed, it does not completely ameliorate data sovereignty issues, as users of the enterprise may not be restricted to using such addresses. Continuing with the above example, a user associated with enterprise location 140b in the EU may be encouraged or configured to utilize an email to fax service available through node 110b in the EU through the interface presented by the fax service of the node 110b at "phonenumber@eu.f2m.com" such that data sovereignty regulations associated with enterprise or the user's region may be maintained with respect to the data the user is faxing.

However, because the user is associated with the enterprise, and has a user account with the enterprise, the user at the enterprise location 140b in the EU may also have access to the fax service available through node 110a in the United States through the interface presented by the fax service of node 110a at "phonenumber@f2m.com". For a variety of reasons, including user carelessness, lack of knowledge, legacy addresses, etc., such a user may transmit data through this interface available through the node 110a in the United States, violating data sovereignty regulations of the enterprise or region with which the user is associated.

As can be seen then, both enterprises and providers of distributed service systems may desire to implement and better enforce data sovereignty in such a distributed computer services architecture. Accordingly, embodiments of the systems and method for implementing data sovereignty safeguards in a distributed services system are presented. In certain embodiments, each of the nodes is configured to determine if that node is data sovereign for a region associated with a user submitting a request for a service through an interface of that service. If the node is not data sovereign for the user's region, the user may be provided with, or otherwise directed to, a corresponding service at a node of the distributed service system that is data sovereign for the user's region.

Specifically, in certain embodiments, the user accounts for an enterprise may be maintained at, or accessible from, each node. A user account for a user may include a region identifier for a region associated with the user. Additionally, each node of the distributed service system may maintain a data sovereignty configuration whereby each region identifier is associated with one or more nodes of the distributed service system. The association may specify, for each node, which regions that node is, or is not, data sovereign for. Each of the services at each of the nodes of the distributed service system may include a data sovereignty module for implementing data sovereignty safeguards with respect to that service on that node.

When a user requests a service through a particular node through the interface associated with that service, the data sovereignty module of that service at that node may access that user's account and determine the user's associated region (e.g., the region identifier associated with that user's account), or may determine the user's associated region from other data, such as data obtained from the user's request. Using the data sovereignty configuration accessible by the node, the data sovereignty module can determine if the node on which the service resides is not (or is) data sovereign for the region associated with user. If the node is data sovereign for the user's region, the data may be transmitted or stored according to the originally received request. If, however, the node at which the request was received is not data sovereign for the user's region, a response may be returned to the user indicating the request cannot be completed. This response may also include the address or other location through which a corresponding service on a node that is data sovereign for the user's region may be accessed.

Figure 2:
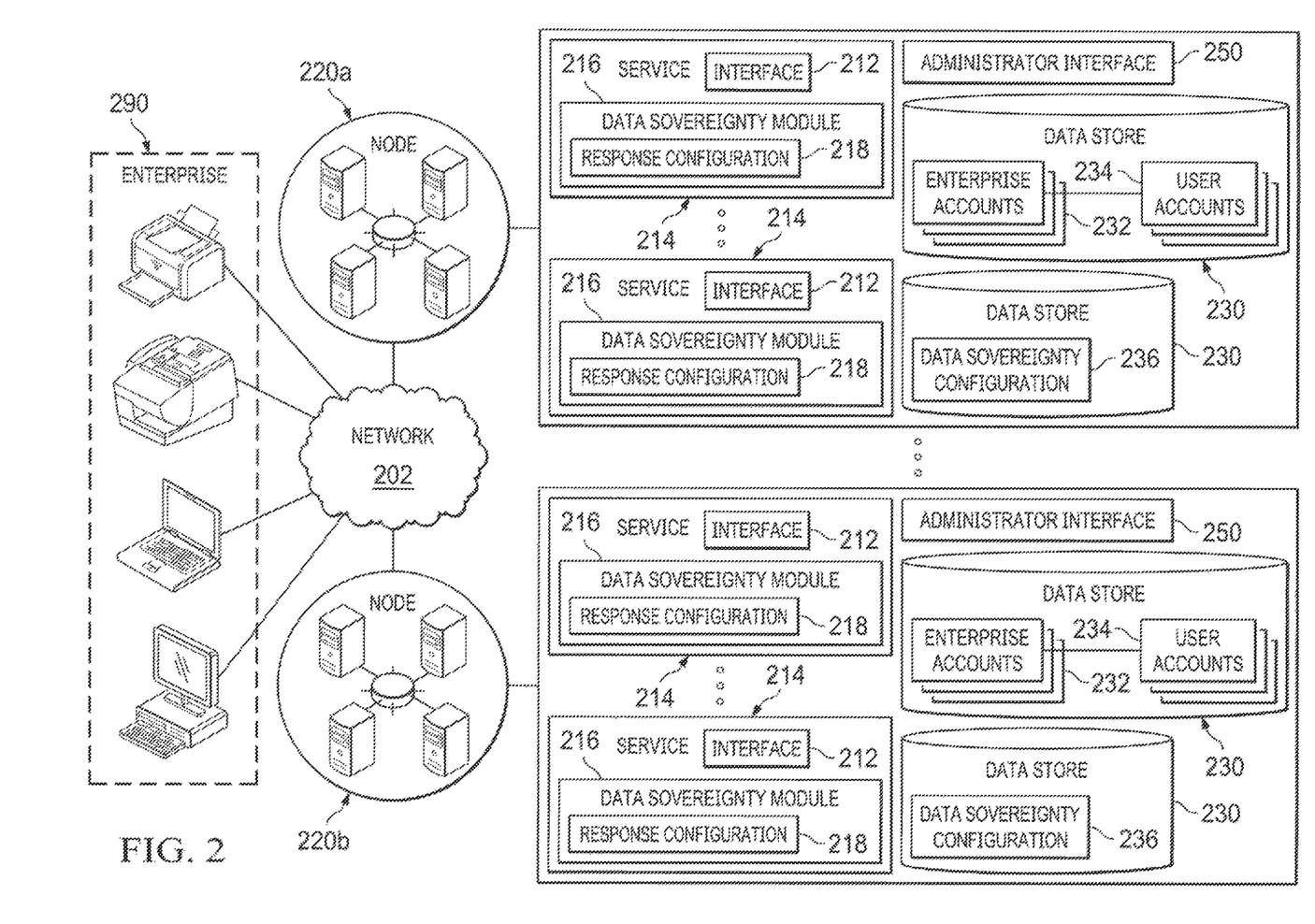
FIG. 2 depicts one embodiment of a distributed services network architecture including an embodiment of an architecture for a node of a distributed service system.

FIG. 2 depicts one embodiment of a distributed services network architecture including an embodiment of an architecture for a node of a distributed service system. A distributed services system is comprised of a set of nodes 220 coupled over network 202. Here, each node 220 of the distributed service system has one or more service modules 214 implemented on one or more servers, each service module 214 configured for implementing a service such as an email to fax service, an email service, an ftp service, an accessible portal or another type of computer service that involves the transmission or storage of data to, or through, the node 220.

As discussed, the enterprise may have an account with the distributed service system which allows users of an enterprise 290 to utilize the services 214 provided by the nodes 220 of the distributed service system. As has been noted, the users of the enterprise 290 may be geographically or otherwise distributed across one or more regions. Data store 230 of the node may include one or more enterprise account records 232 which include data on the enterprise 290. Associated with each of the enterprise account records 232 may be one or more user account records 234 for each user of the enterprise 290 that may utilize the services of the distributed service system. Each user account record 234 may include user preferences and include information that may be used to authenticate the user. This information may include, for example, user credentials such as a user name and password or a public key associated with the user. The user account record 234 may also specify whether the user is a data sovereign user (e.g., whether data sovereignty checks should be performed for requests for that user), and a region identifier associated with that user.

In one embodiment, the enterprise account records 232 or user account records 234 may be created or updated using administrative interface 250 available at the node 220. The administrative interface 250 may be a web based interface accessible using a web browser or the like. An administrative user associated with the enterprise 290 may utilize the administrator interface to create or update an enterprise account record 232 with information regarding the enterprise 290 or to create a user account record 234 associated with a user of the enterprise 290.

When creating the user account record 234 for a user, the administrator may specify whether the user is to be a user of the data sovereign functionality of the distributed service system and a region associated with that user such that this data (e.g., a flag indicating if the user is a data sovereign user and a region identifier associated with a region for the user) may be stored in the user account record 234 for that user.

The enterprise account records 232 and user account records 234 may be replicated across the nodes 220 of the distributed service system such that the data store 230 of each node 220 includes the same enterprise account records 232 and user account records 234. This replication may be handled by a replication service operating on each of the nodes 220 such as the "Validate" database replication service. As such, when a user account record 234 is created on a particular node 220 of the distributed service system, the account record 234 may be propagated or replicated across each of the other nodes 220 of the distributed services system.

The data store 230 on each node 220 may also include a data sovereignty configuration 236. This data sovereignty configuration 236 may, for example, include a set of region identifiers that are not data sovereign for the associated node 220 of the distributed service system (e.g., identifiers for that node). In other words, the data sovereignty configuration may include a set of node identifiers for the nodes 220, where each node identifier is associated with zero or more region identifiers indicating for the corresponding node 220 that the node is not (or is) data sovereign for that region. Alternatively, the data sovereignty configuration may include a set of region identifiers, where each region identifier may be associated with zero or more node identifiers indicating for the corresponding region identifier that the node is not (or is) data sovereign for that region. The data sovereignty configuration 236 may also include only the data sovereignty data for that node 220. Thus, it may for example, contain a list of region identifiers for what that node 220 is not (or is) data sovereign. For each of the region identifiers, it can thus be determined if a node is not (or is) data sovereign for that region (i.e., implements data sovereign regulations associated with that region) on that node.

The data sovereignty configuration 236 may be defined using administrator interface 250 such that an administrator associated with the distributed service system may utilize the interface 250 to define associated region identifiers for each node. The data sovereignty configuration 236 may not be replicated across nodes 220 of the distributed service system.

Accordingly, users of an enterprise may access a desired service 214 of a node 220 of the distributed service system through an interface 212 offered by that service 214. These services may include, for example, a fax service, an email to fax service, an email service, an SMS service, etc. In particular, each node 220 may have one or more unique addresses (e.g., IP addresses) or locations on the network (collectively addresses) and the interface 212 for each service 214 provided by the node 220 may be accessible at a unique address. For example, node 220b may be in the United States and may offer an email to fax service 214 accessible through interface 212 at a "phonenumber@f2m.com" address while node 220a that may be data sovereign for the European Union may offer a fax to email service accessible through interface 212 of service 214 at a "phonenumber@eu.f2m.com" address.

To implement and enforce data sovereignty with respect to nodes 220 and services 214 of the distributed service system, each of the services 214 on the nodes 220 may also include a data sovereignty module 216 configured to implement and enforce data sovereignty with respect to that service 214 at that node 220. Specifically, in one embodiment, when a request is received for the service 214 through the interface 212, the request may be associated with a user of the enterprise 290. This user may have been previously authenticated using the user credential stored in the user account records 234 or may be authenticated at the time the request is made. Data sovereignty module 216 can thus access the user account record 234 associated with the user submitting the request for the service 214 through interface 212. For example, the user account record 234 may be accessed using a token included in the submitted request. From the user account record 234, data sovereignty module 216 can determine if the user who submitted the request is a data sovereign user and, if so, the region identifier associated with that user. If the user is not a data sovereign user, this indicates that there is no need to determine if the node 220 is data sovereign for a region associated with the user and the service 214 is allowed to process the request.

Other methods for determining a region identifier for the user may also be utilized and are fully contemplated herein. For example, an IP address or other metadata associated with the submitted request may be utilized to determine a geographical location associated with the user and the geographical location mapped to a region identifier to determine a region identifier for the user.

If the user is a data sovereign user of the distributed service system, the determined region identifier for that user may be submitted to data sovereignty module 216 in a request to determine if the node 220 at which the request from the user was received is not (or is) data sovereign for the region identified by the region identifier associated with the user.

Specifically, the data sovereignty module 216 may offer an interface such as an API or web services interface through which a request is submitted to determine whether the node is not data sovereign for the region identifier. When such a request is received, the data sovereignty module 216 can access the data sovereignty configuration 236 of the node 220 to determine if the node 220 is not data sovereign for the received region identifier and return a corresponding response.

The determination of whether the node is data sovereign for the received region identifier may depend on the data sovereignty configuration 236. For example, the data sovereignty configuration 236 may specify that the request is to be processed in an "allow" configuration whereby if the received region identifier is within a set of region identifiers specified as data sovereign for the node in the data sovereignty configuration 236, the response may indicate the node is data sovereign for the received region identifier, while if the received region identifier is not within the set of region identifiers specified as data sovereign for the node in the data sovereignty configuration 236, the response may indicate the node 220 is not data sovereign for the received region identifier.

As another example, the data sovereignty configuration 236 may specify that the request is to be processed in a "deny" configuration, whereby if the received region identifier is within a set of region identifiers specified as not data sovereign for the node 220 in the data sovereignty configuration 236, the response may indicate the node is not data sovereign for the received region identifier. Conversely, if the received region identifier is not within the set of region identifiers specified as not data sovereign for the node in the data sovereignty configuration 236, the response may indicate the node 220 is data sovereign for the received region identifier.

If the response from the data sovereignty module 216 indicates the node 220 is data sovereign for the identified region, the data sovereignty module 216 allows the service 214 to process the request. Conversely, if the response from data sovereignty module 216 indicates the node 220 at which the user's request was received is not data sovereign for the identified region for the user, a response may be returned to the user via the interface 212 indicating the request for the service cannot be completed. This response may be a simple error message in one embodiment.

In other embodiments, the response may be composed based on a response configuration 218 of the data sovereignty module 216. The response configuration may indicate a type and content of the response to be returned to the user. In particular, the response configuration 218 may include a mapping between region identifiers and nodes, addresses or a form response for that region identifier, such that, based on region identifier (e.g., a user's region identifier) an appropriate node, address or actual response may be determined from the response configuration 218.

By allowing the response configuration 218 to be specific to the service 214 and the node 220, the response messages can, if desired, be individually tailored based on the service 214 requested, the node at which the service was requested, a user's region, a region for which the node is data sovereign, or a wide variety of other criteria. This response configuration 218 may be, for example, set by an administrator associated with the distributed service system using administrator interface 250 or the like.

In one embodiment, the response configuration 218 may include a set of text in one or more languages notifying the user that the request for the service 214 cannot be submitted at the address associated with interface 212. Moreover, the response configuration 218 may include one or more addresses for corresponding services 214 on one or more other nodes 220 and identifiers for the regions for which those nodes are data sovereign. As mentioned, in one embodiment, the response configuration 218 may include a mapping between region identifiers and responses for that region identifier, such that, based on a region identifier (e.g., a user's region identifier) a response may be determined from the response configuration 218.

Thus, to formulate a response, the data sovereignty module 216 may utilize the region identifier or other information in the user account record 234 for the user to determine text and an address for a corresponding service 214 in a node 220 that is data sovereign for the user's region identifier based on the response configuration 218. This text and address can be returned to the user in response to the request received from the user. In one embodiment, this response may also be, or include, a redirect or a link such that the user may be able to access the interface 212 of the service 214 that is data sovereign for the user's region directly from the response. The response may have, for example, a text block intended for a human user, a computer readable structured block and the headers of the original request (or message of the request) being rejected.

For example, the text may include Hyper-Text Markup Language (HTML) such as the following to return to the user in response to a received request if the node 220 at which the request was received was not data sovereign for the user. The HTML for such a response may include the following:

<html>
<meta http-equiv="Content-Type" content="text/html; charset=utf-8">
<p>Your message was sent to the incorrect mail domain (@f2m.com).
This message will be DELETED and will not be delivered to the recipient. You must RESEND your Fax to the @eu.f2m.com domain.</p>
<p>Su mensaje fue enviado al dominio de correo incorrecta (@f2m.com).
Este mensaje será borrado y no se entregará a la destinatario. Usted debe enviar su fax al dominio @eu.f2m.com.</p>
<p>Votre message a été envoyé au domaine incorrect mail (@f2m.com).
Ce message sera supprimé et ne sera pas livré à la destinataire. Vous devez renvoyer votre fax au domaine @eu.f2m.com.</p>
<p>Deine Nachricht wurde an den falschen Mail-Domäne (@f2m.com)gesendet. Diese Nachricht wird gelöscht and nicht an die geliefert werden Empfänger. Sie müssen Ihr Fax mit dem @eu.f2m.com Domäne erneut zu senden.</p></html>

Figure 3:
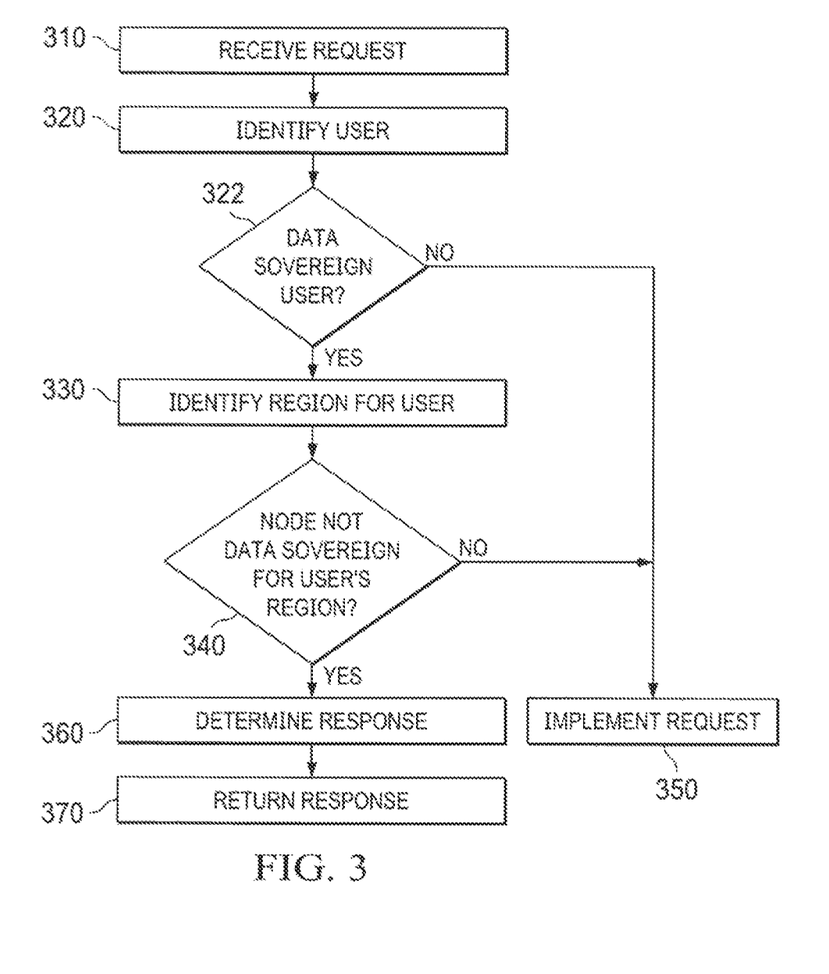
FIG. 3 depicts one embodiment of a method for implementing data sovereignty in a distributed services system.

Looking now at FIG. 3, one embodiment of a method for implementing or enforcing data sovereignty in association with a distributed service system is depicted. Initially, a request for a service is received from a user of an enterprise at a node of the distributed service system through the interface of the requested service (STEP 310). The user who issued the request can then be identified (STEP 320). In particular, the user may have been previously authenticated, or may be authenticated, using a user credential such as a password or a public key associated with the user.

Once the user is identified, it can be determined if the user is to be subject to data sovereignty enforcement (STEP 322) and, if so, a region associated with the user can be identified (STEP 330). In one embodiment, a user account record associated with the user may include a flag or other data specifying whether the user associated with the user account record is to be subject to data sovereignty enforcement and a region identifier identifying a region for the user. Such an account record can be accessed based on the user's authentication credentials.

From the account record it can be determined if the user is a data sovereign user (STEP 322). If the user is not a data sovereign user, the service for which the request was received is allowed to process the request (STEP 350). If the user is a data sovereign user (STEP 322), the region identifier associated with the user can be determined from the user account record as well (STEP 330).

Based on the region identifier associated with the user, it can then be determined if the node at which the request was received (e.g., the node on which the requested service is implemented) is not data sovereign for the user's identified region (STEP 340). Such a determination may be made by accessing a data sovereignty configuration indicating one or more identifiers for regions for which the node at which the request was received is not data sovereign. The region identifiers associated with the node can be compared to the region identifier associated with the user to determine if there is a match. If there is a match, the node cannot be considered data sovereign for the region associated with the user. Otherwise, the node may be considered data sovereign for the user's region.

If the node at which the request was received is not data sovereign for the identified region for the user, a response may be determined (STEP 360). This response may be determined based on a response configuration associated with the service requested or the node at which the requested service resides. Moreover, the determination of the response may be based on the user's identified region. Otherwise, the node is considered data sovereign for the user's identified region (STEP 340), and the service for which the request was received is allowed to process the request (STEP 350).

In one embodiment, an address where a corresponding service of the distributed service system may be requested on a node that is data sovereign for the user's identified region may be determined and included in the response to the user. In this manner, the user may be provided with the proper location to request the desired service such that data sovereignty can be maintained with respect to the requested service and the user's data. The determined response may also include text indicating the request has been rejected. This response may then be returned to the user in response to the initially received request (STEP 370).

In addition to the text and message contents described above, other types of determined responses may be returned to a user in response to a request from that user to a node which is not data sovereign for that user and are fully contemplated herein.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a Storage Area Network (SAN), etc.), another computer, or in a standalone computer. As is known to those skilled in the art, the computer can include a central processing unit ("CPU") or processor, at least one read-only memory ("ROM"), at least one random access memory ("RAM"), at least one HD, and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a Direct Access Storage Drive (DASD) array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

What is claimed is:

1. A method, comprising:
   receiving, at a node of a distributed service system, a request for a service from a user, the request received through an interface of the service provided by the node;
   determining, at the node, whether data sovereignty enforcement should be implemented with respect to the request;
   when it is determined that data sovereignty enforcement should be implemented with respect to the request, identifying whether the service provided by the node, a data store associated with the node, or the node, is data sovereign for a region associated with the user or the request;
   when it is determined that the service provided by the node, a data store associated with the node, or the node, is not data sovereign for the region, determining a response based on a response configuration, wherein the response includes a location of an other node or an other service of the distributed service system that is data sovereign for the region, wherein the other node or other service implements the same service provided by the node; and
   sending a communication to the other node or other server, or to the user, based on the determined response.

2. The method of claim 1, wherein the response comprises implementing the request utilizing the other node or other service.

3. The method of claim 2, wherein the communication comprises forwarding the request to the other node or the other service.

4. The method of claim 1, wherein the determination that data sovereignty enforcement should be implemented with respect to the request is based on an enterprise account or user account maintained by the distributed service system.

5. The method of claim 4, wherein the determination that the service provided by the node is not data sovereign for the region is based on the enterprise account or the user account maintained by the distributed service system.

6. The method of claim 5, wherein the enterprise account or the user account are replicated across the node and the other node of the distributed service system.

7. A system, comprising:
   a processor;
   a non-transitory computer-readable medium comprising instructions for performing, at a node of a distributed service system:
   receiving a request for a service from a user, the request received through an interface of the service provided by the node;
   determining whether data sovereignty enforcement should be implemented with respect to the request;
   when it is determined that data sovereignty enforcement should be implemented with respect to the request, identifying whether the service provided by the node, a data store associated with the node, or the node, is data sovereign for a region associated with the user or the request;

when it is determined that the service provided by the node, a data store associated with the node, or the node, is not data sovereign for the region, determining a response based on a response configuration, wherein the response includes a location of an other node or an other service of the distributed service system that is data sovereign for the region, wherein the other node or other service implements the same service provided by the node; and sending a communication to the other node or other server, or to the user, based on the determined response.

8. The system of claim 7, wherein the response comprises implementing the request utilizing the other node or other service.

9. The system of claim 8, wherein the communication comprises forwarding the request to the other node or the other service.

10. The system of claim 7, wherein the determination that data sovereignty enforcement should be implemented with respect to the request is based on an enterprise account or user account maintained by the distributed service system.

11. The system of claim 10, wherein the determination that the service provided by the node is not data sovereign for the region is based on the enterprise account or the user account maintained by the distributed service system.

12. The system of claim 11, wherein the enterprise account or the user account are replicated across the node and the other node of the distributed service system.

13. A non-transitory computer-readable medium storing instructions for:

receiving, at a node of a distributed service system, a request for a service from a user, the request received through an interface of the service provided by the node;

determining, at the node, whether data sovereignty enforcement should be implemented with respect to the request;

when it is determined that data sovereignty enforcement should be implemented with respect to the request, identifying whether the service provided by the node, a data store associated with the node, or the node, is data sovereign for a region associated with the user or the request;

when it is determined that the service provided by the node, a data store associated with the node, or the node, is not data sovereign for the region, determining a response based on a response configuration, wherein the response includes a location of an other node or an other service of the distributed service system that is data sovereign for the region, wherein the other node or other service implements the same service provided by the node; and sending a communication to the other node or other server, or to the user, based on the determined response.

14. The non-transitory computer-readable medium of claim 13, wherein the response comprises implementing the request utilizing the other node or other service.

15. The non-transitory computer-readable medium of claim 14, wherein the communication comprises forwarding the request to the other node or the other service.

16. The non-transitory computer-readable medium of claim 13, wherein the determination that data sovereignty enforcement should be implemented with respect to the request is based on an enterprise account or user account maintained by the distributed service system.

17. The non-transitory computer-readable medium of claim 16, wherein the determination that the service provided by the node is not data sovereign for the region is based on the enterprise account or the user account maintained by the distributed service system.

18. The non-transitory computer-readable medium of claim 17, wherein the enterprise account or the user account are replicated across the node and the other node of the distributed service system.

* * * * *